United States Patent
Murazaki

(10) Patent No.: US 7,608,202 B2
(45) Date of Patent: Oct. 27, 2009

(54) PHOSPHOR AND LIGHT EMITTING DEVICE USING THE SAME

(75) Inventor: Yoshinori Murazaki, Komatsushima (JP)

(73) Assignee: Nichia Corporation, Anan-shi (JP)

( * ) Notice: Subject to any disclaimer, the term of this patent is extended or adjusted under 35 U.S.C. 154(b) by 228 days.

(21) Appl. No.: 11/700,763

(22) Filed: Feb. 1, 2007

(65) Prior Publication Data

US 2007/0200095 A1   Aug. 30, 2007

(30) Foreign Application Priority Data

Feb. 2, 2006   (JP)   ............... P2006-026114
Jan. 17, 2007   (JP)   ............... P2007-007538

(51) Int. Cl.
| C09K 11/02 | (2006.01) |
| C09K 11/66 | (2006.01) |
| C09K 11/61 | (2006.01) |
| C09K 11/07 | (2006.01) |
| H01J 1/62 | (2006.01) |
| H01J 63/04 | (2006.01) |

(52) U.S. Cl. .................. 252/301.4 F; 252/301.4 R; 252/301.4 H; 313/302

(58) Field of Classification Search .......... 252/301.4 H, 252/301.4 R, 301.4 F; 313/302
See application file for complete search history.

(56) References Cited

U.S. PATENT DOCUMENTS

| 3,544,481 | A | 12/1970 | Thomas |
| 6,504,179 | B1 | 1/2003 | Ellens et al. |
| 6,809,347 | B2 | 10/2004 | Tasch et al. |
| 6,943,380 | B2 | 9/2005 | Ota et al. |
| 7,002,291 | B2* | 2/2006 | Ellens et al. ............. 313/503 |
| 7,023,019 | B2 | 4/2006 | Maeda et al. |
| 7,064,480 | B2 | 6/2006 | Bokor et al. |
| 7,183,700 | B2* | 2/2007 | Guo et al. ............. 313/46 |
| 2003/0006469 | A1 | 1/2003 | Ellens et al. |
| 2003/0227007 | A1 | 12/2003 | Ezuhara et al. |
| 2005/0227569 | A1 | 10/2005 | Maeda et al. |
| 2006/0055315 | A1 | 3/2006 | Bokor et al. |

FOREIGN PATENT DOCUMENTS

| EP | 0 972 815 | 1/2000 |
| GB | 1 299 608 | 12/1972 |
| JP | 2003-306674 A | 10/2003 |
| JP | 2003/535478 A | 11/2003 |
| JP | 2004-505470 A | 2/2004 |
| JP | 2004-115633 A | 4/2004 |
| JP | 2004-516688 A | 6/2004 |
| JP | 2004-296830 A | 10/2004 |
| JP | 2006-219636 A | 8/2006 |
| WO | WO-01/93342 A1 | 12/2001 |
| WO | WO-03/021691 A1 | 3/2003 |

OTHER PUBLICATIONS

Lin. "Sensitized luminescence and energy transfer in Ce and Eu codoped calcium magnesium chlorosilicate" Optical Materials 18 (2002) 397-401.*

Xiao Zhang et al., J. Electrochem. Soc., vol. 139, No. 2, pp. 622-625, Feb. 1992, The Electrochemical Society, Inc.

* cited by examiner

*Primary Examiner*—Jerry Lorengo
*Assistant Examiner*—Matthew E Hoban
(74) *Attorney, Agent, or Firm*—Birch, Stewart, Kolasch & Birch, LLP

(57) ABSTRACT

There is provided a phosphor emitting light of high brightness and having high weatherability, which has a composition represented by the following general formula:

$$(M^1_{1-y}R_y)_a MgM^2_b M^3_c O_{a+2b+(3/2)c} X_2$$

wherein $M^1$ is at least one element selected from the group consisting of Ca, Sr, Ba, Zn and Mn, $M^2$ is at least one element selected from the group consisting of Si, Ge and Sn, $M^3$ is at least one element selected from the group consisting of B, Al, Ga and In, X is at least one element selected from the group consisting of F, Cl, Br and I, R is at least one element selected from the group consisting of rare earth elements with Eu being an inevitable element, and y, a, b and c satisfy the following relationships of $0.0001 \leq y \leq 0.3$, $7.0 \leq a < 10.0$, $3.0 \leq b < 5.0$ and $0 \leq c < 1.0$.

20 Claims, 4 Drawing Sheets

PHOSPHOR AND LIGHT EMITTING DEVICE USING THE SAME

BACKGROUND OF THE INVENTION

1. Field of the Invention

The present invention relates to a phosphor and a light emitting device using the same. The light emitting device is used in signal lights, illumination apparatuses, displays, indicators and the like.

2. Description of the Related Art

Light emitting devices constituted from a combination of a light source and a phosphor which emits light when excited by light from the light source has been widely known hitherto. These light emitting devices include one that combines a light source emitting light in a region ranging from near-ultraviolet rays to visible light of shorter wavelengths and a phosphor which emits light when excited by the light from the light source. This type of light emitting device uses a phosphor having a composition of, for example, ZnS:Cu, (Sr, Ca)Ga$_2$S$_4$:Eu or SrAl$_2$O$_4$:Eu. However, such phosphor has low weatherability and low light emission efficiency. Thus there is a demand for phosphors which emit light over a region ranging from green to yellow light with high weatherability and high light emission efficiency.

In recent years silicate-based phosphors have been known which emit light over a region ranging from green to yellow light, such as (Ca$_{0.99}$Eu$_{0.01}$)$_2$MgSi$_2$O$_7$ (refer to, for example, JP 2003-306674A). The silicate-based phosphors are excited with high efficiency by light of wavelengths ranging from 350 nm to 500 nm emitted by blue light emitting element, and emit yellow light.

There is a silicate-based phosphor having a composition of (Sr$_{0.93}$Ba$_{0.05}$Eu$_{0.02}$)$_2$SiO$_4$ (refer to, for example, JP 2004-115633A). This silicate-based phosphor emits yellow light with peak emission wavelength of 570 nm when excited by monochromatic light in a wavelength ranging from 120 nm to 550 nm. There is also a silicate-based phosphor having the composition of (Sr$_{0.37}$Ba$_{0.6}$Ca$_{0.01}$Eu$_{0.02}$)$_2$SiO$_4$ (refer also to JP 2004-115633A). This silicate-based phosphor emits green light with peak emission wavelength of about 522 nm.

Furthermore, there is also known yttrium-aluminum oxide phosphor (hereinafter called YAG phosphor) which is excited by light in a region ranging from near-ultraviolet rays to visible light of shorter wavelengths and emits yellow or green light. The YAG phosphor emits light of high brightness and has high weatherability.

However, the phosphors emitting yellow or green light currently available do not have sufficiently high efficiency of emission for use in light emitting devices including the applications to display and illumination, and it is called for to further improve the brightness of light emission and the mass productivity. Particularly, there is known no phosphor which is capable of emitting green or yellow light with a high brightness comparable to that of the YAG phosphor. Thus there is such a problem that emitting light including much green component requires the phosphor to include a high proportion of green light emitting phosphor which has low efficiency of emission, thus resulting in lower relative brightness.

SUMMARY OF THE INVENTION

With the background described above, an object of the present invention is to provide a phosphor which emits light of high brightness and has high weatherability. In addition, another object of the present invention is to provide a light emitting device using the phosphor.

To solve the problems described above, the present inventors have intensively studied and thus the present invention has been completed.

The present invention relates to a phosphor having a composition represented by the following general formula:

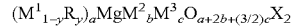

wherein $M^1$ is at least one element selected from the group consisting of Ca, Sr, Ba, Zn and Mn, $M^2$ is at least one element selected from the group consisting of Si, Ge and Sn, $M^3$ is at least one element selected from the group consisting of B, Al, Ga and In, X is at least one element selected from the group consisting of F, Cl, Br and I, R is at least one element selected from the group consisting of rare earth elements with Eu being an inevitable element (in other words, R is Eu and optionally further contains one or more elements selected from the group consisting of rare earth elements except Eu.), and y, a, b and c satisfy the following relationships of $0.0001 \leq y \leq 0.3$, $7.0 \leq a < 10.0$, $3.0 \leq b < 5.0$ and $0 \leq c < 1.0$.

With the constitution described above, a phosphor which emits light of high brightness and has high weatherability can be provided.

The present invention is capable of providing a light emitting device comprising a light source and a phosphor having a composition represented by the following general formula which is excited by the light emitted by the light source:

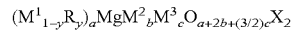

wherein $M^1$ is at least one element selected from the group consisting of Ca, Sr, Ba, Zn and Mn, $M^2$ is at least one element selected from the group consisting of Si, Ge and Sn, $M^3$ is at least one element selected from the group consisting of B, Al, Ga and In, X is at least one element selected from the group consisting of F, Cl, Br and I, R is at least one element selected from the group consisting of rare earth elements with Eu being inevitable element, and y, a, b and c satisfy the following relationships of $0.0001 \leq y \leq 0.3$, $7.0 \leq a < 10.0$, $3.0 \leq b < 5.0$ and $0 \leq c < 1.0$. With the constitution described above, a light emitting device having high brightness of light emission can be provided.

The present invention, with the constitution described above, is capable of providing a phosphor which emits light of high brightness and has high weatherability. The present invention also provides a light emitting device having high brightness of light emission.

DETAIL DESCRIPTION OF THE INVENTION

Figure 1:
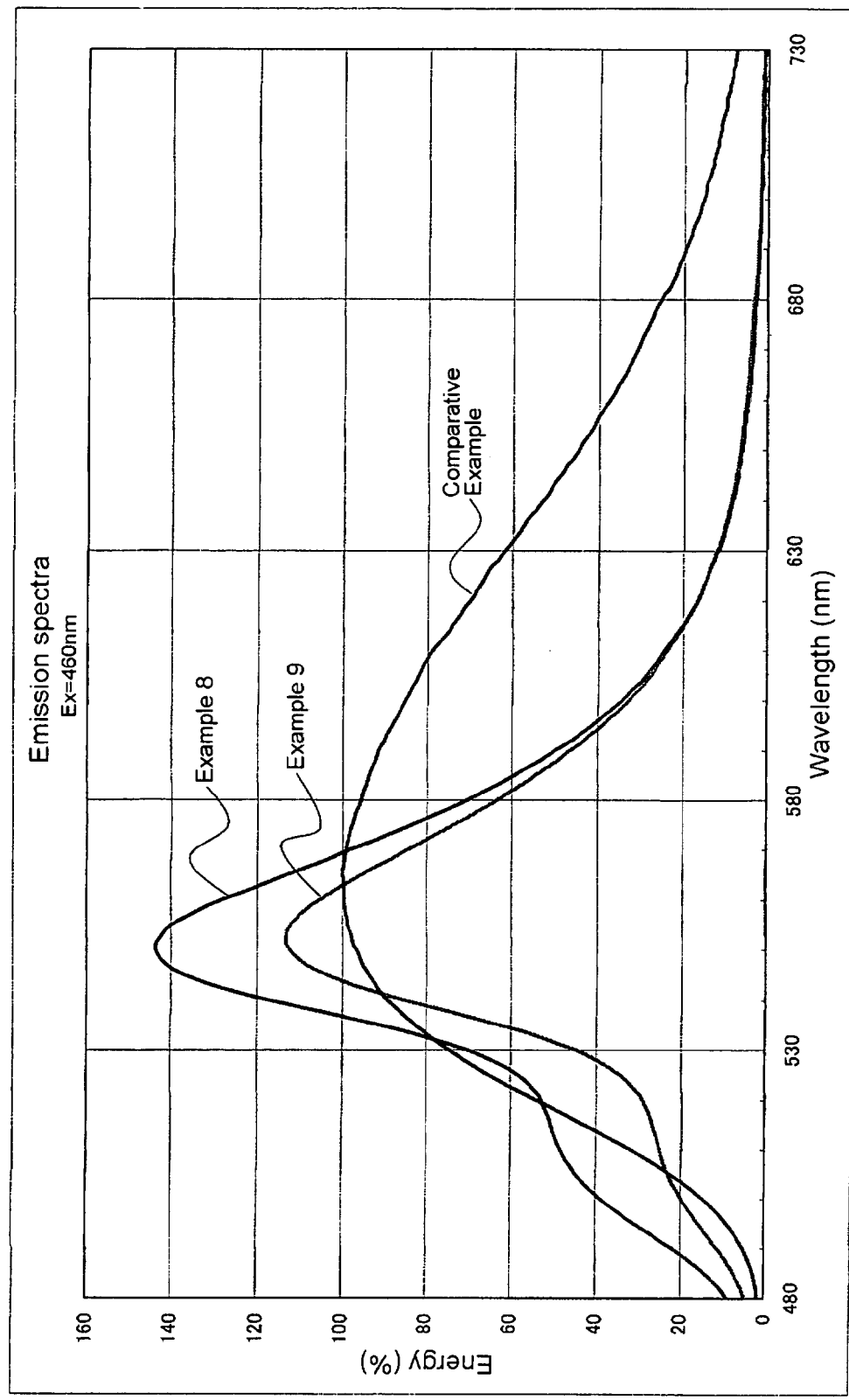
FIG. 1 shows emission spectra of Examples 8 and 9.

The phosphor and the light emitting device of the present invention and a method for manufacturing the same will now be described by way of embodiments and Examples. It is to be understood, however, that the present invention is not limited to those embodiments and Examples.

Embodiments (Phosphor)

One embodiment of the phosphors of the present invention has the composition represented by the following general formula:

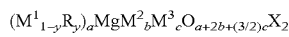

$$(M^1_{1-y}R_y)_a MgM^2_b M^3_c O_{a+2b+(3/2)c} X_2$$

wherein $M^1$ is at least one element selected from the group consisting of Ca, Sr, Ba, Zn and Mn, $M^2$ is at least one element selected from the group consisting of Si, Ge and Sn, $M^3$ is at least one element selected from the group consisting of B, Al, Ga and In, X is at least one element selected from the group consisting of F, Cl, Br and I, R is at least one element selected from the group consisting of rare earth elements with Eu being inevitable element, and y, a, b and c satisfy the following relationships of $0.0001 \leq y \leq 0.3$, $7.0 \leq a < 10.0$, $3.0 \leq b < 5.0$ and $0 \leq c < 1.0$.

The phosphor includes at least one element selected from the group consisting of Ca, Sr, Ba, Zn and Mn. Preferably, the phosphor includes Ca, while a portion of Ca may be substituted with at least one of Mn, Sr and Ba.

The phosphor includes at least one element selected from the group consisting of Si, Ge and Sn. Preferably, the phosphor includes Si, while a portion of Si may be substituted with Ge and/or Sn.

The phosphor includes at least one element selected from the group consisting of F, Cl, Br and I. Preferably, the phosphor includes Cl, while a portion of Cl may be substituted with at least one of F, Br and I.

The phosphor includes Eu as an essential element. In addition to Eu the phosphor may include at least one element selected from the group consisting of rare earth elements except Eu. The "rare earth elements" refers to 17 elements of scandium, yttrium and lanthanides. In the most preferable embodiment, only Eu is included in the composition of the phosphor according to the present invention, while a portion of Eu may be substituted with at least one element selected from the group consisting of Ce, Pr, Nd, Sm, Tb, Dy, Ho, Er, Tm and/or Yb. More preferably, a portion of Eu is substituted with at least one element selected from the group consisting of Ce, Pr, Nd, Sm, Tb, Dy, Ho and/or Tm.

There is no restriction on the kind of raw materials, as long as the composition described above is obtained. For example, single elements, oxides, carbonates and nitrides thereof may be used. Specifically, $M^1CO_3$, $M^1O$, $M^1$, MgO, $MgCO_3$, Mg, $M^2(CO_3)_2$, $M^2O_2$, $M^2$, $M^3_2(CO_3)_3$, $M^3_2O_3$, $M^3$, $M^1X_2$, HX, $X_2$ and the like may be used.

The phosphor of the present invention has a peak of emission at a wavelength in a range from 495 nm to 584 nm, corresponding to a region ranging from green to yellow light. In case the phosphor includes the elements of Ca, Eu, Mg, Si, O, Cl, for example, it may have a peak of emission at a wavelength between about 500 nm and about 520 nm, and a phosphor including the elements of Ca, Mn, Eu, Mg, Si, O, Cl may have a peak of emission at a wavelength between about 530 nm and about 570 nm. However, the peak emission wavelength varies depending on the amounts of the elements contained in the phosphor and the composition of the phosphor.

(Method for Manufacturing Phosphor)

The raw materials are weighed out so as to finally obtain the predetermined composition. It may be necessary to prepare a larger amount(s) of the raw material(s) than dictated by the predetermined composition, when there is a possibility of the material(s) to disperse during the manufacturing process.

The raw materials which have been weighed out are mixed in a mixing machine or the like so as to prepare a mixture of the raw materials. For the mixing machine, besides a ball mill which is commonly used in industrial processes, a vibration mill, a roll mill, a jet mill or other grinders may be used so as to grind the raw materials and increase their specific surface areas. In order to control the specific surface area of the resultant powder within a predetermined range, the materials may also be classified using a wet classifier such as a sedimentation tank, a hydrocyclone, a centrifugal separator or the like which is commonly used in industrial processes, or a dry classifier such as a cyclone or an air separator.

The resulted mixture is put into a crucible made of SiC, quartz, alumina or the like, and is fired in a reducing atmosphere such as $N_2$, $H_2$ or a combination of $N_2$ and $H_2$. The firing may also be carried out in argon atmosphere or ammonia atmosphere. The firing is carried out at a predetermined temperature for several hours.

The fired mixture is subjected to grinding, dispersion, filtration and/or other process to obtain the desired phosphor powder. Separation of solid and liquid components may be carried out by a process commonly used in industrial processes such as filtration, suction filtration, pressure filtration, centrifugal separation or decantation. The material may be dried by using an equipment commonly used in industrial processes such as a vacuum drier, a hot air-heating dryer, a conical dryer or a rotary evaporator.

(Light Emitting Device)

While there is no restriction on the light emitting device as long as it has a constitution for exciting the phosphor of the present invention and causing it to emit light, a light emitting device using a light emitting element will be described as an example.

As a light emitting device using a light emitting element, the bullet-shaped light emitting device and the surface-mounted light emitting device are widely known. The bullet-shaped light emitting device comprises a light emitting element, a first lead having a cup-shaped portion in which the light emitting element is placed, a second lead electrically connected to the light emitting element and a molding resin which covers the light emitting element. The molding resin may be either one type resin, or a plurality of types of resins disposed in the cup of the first lead. The phosphor is mixed in a part or the whole of the molding resin so as to produce various color tones. The surface-mounted light emitting device comprises a light emitting element, a package which secures a first lead and a second lead, and a sealing resin which covers the light emitting element. The light emitting element is electrically connected to the first lead and the second lead. The package has a recess defined by a bottom surface and a side surface, to accommodate the light emitting element placed on the bottom surface of the recess. The sealing resin is disposed in the recess of the package. The phosphor is mixed in a part or the whole of the sealing resin so as to produce various color tones.

Light emitting devices which emit various color tones can be provided by combining the light source and the phosphor of the present invention or combining the light source, the phosphor of the present invention and other phosphor(s)

A phosphor having a composition different from that of the phosphor of the present invention will be referred to as a second phosphor.

The constituent members of the light emitting device will now be described.

(Light Source)

There is no restriction on the light source as long as it is capable of exciting the phosphor of the present invention. For example, a light emitting element such as a light emitting diode (LED) and a laser diode (LD) may be used. In addition, other light source such as a filament and a lamp which may become the light source may also be used. However, the light source is preferably a light emitting element, since a light emitting device having a small size and a long life can be provided by combining the light emitting element and the phosphor.

(Light Emitting Element)

The light emitting element may be made by forming a light emitting layer of a semiconductor such as GaAlN, ZnS, ZnSe, SiC, GaP, GaAlAs, AlN, InN, AlInGaP, InGaN, GaN, AlInGaN or the like on a substrate. The semiconductor may have a homojunction structure, a heterojunction structure or a double-heterojunction structure having MIS junction, PIN junction or PN junction. The emission wavelength can be selected in a region ranging from ultraviolet rays to infrared rays, by changing the materials used to form the semiconductor layer and the crystal mixing ratio. The light emitting layer may be formed as a thin film which has quantum effect in a single quantum well structure or multiple quantum well structure.

The number of the used light emitting element(s) may be single or plural. Color mixing property in producing white light can be improved by combining a plurality of the light emitting elements.

The light emitting element may be changed depending on the absorption spectrum and the emission spectrum of the phosphor as well as the color of light emitted by the light emitting device, and preferably has a peak of emission at a wavelength in a range from 240 nm to 520 nm. The peak emission wavelength is more preferably in a region from 300 nm to 500 nm, and most preferably in a region from 320 nm to 480 nm.

(Second Phosphor)

Besides the phosphor of the present invention, the second phosphor may also be used in the light emitting device, thus making it possible to provide light emitting devices which emit various color tones. The second phosphor is required only to be capable of absorbing light emitted by the light emitting element and transforming it into light of a different wavelength. The second phosphor is preferably at least one selected from nitride-based phosphor or oxynitride-based phosphor activated mainly with a lanthanoid element such as Eu, Ce or the like; alkaline earth element halogen apatite phosphor, alkaline earth metal element boride halogen phosphor, alkaline earth metal element aluminate phosphor, alkaline earth element silicate, alkaline earth element sulfide, alkali earth element thiogallate, alkaline earth element silicon nitride and germanate activated mainly with a lanthanoid element such as Eu or a transition metal element such as Mn; rare earth aluminate and rare earth silicate activated mainly with a lanthanoid element such as Ce, and organic compound and organic complex activated mainly with a lanthanoid element such as Eu. Specifically, the phosphors discussed below may be used, but the present invention is not limited to these materials.

The nitride-based phosphors activated mainly with a lanthanoid element such as Eu, Ce or the like include $M_2Si_5N_8$:Eu (M is at least one element selected from the group consisting of Sr, Ca, Ba, Mg and Zn) and the like. In addition to $M_2Si_5N_8$:Eu, $MSi_7N_{10}$:Eu, $M_{1.8}Si_5O_{0.2}N_8$:Eu, $M_{0.9}Si_7O_{0.1}N_{10}$:Eu (M is at least one element selected from the group consisting of Sr, Ca, Ba, Mg and Zn) and the like are also included.

The oxynitride-based phosphors activated mainly with a lanthanoid element such as Eu, Ce and the like include $MSi_2O_2N_2$:Eu (M is at least one element selected from the group consisting of Sr, Ca, Ba, Mg and Zn).

The alkaline earth element halogen apatite phosphor activated mainly with a lanthanoid element such as Eu or a transition metal element such as Mn include $M_5(PO_4)_3X$:R (M is at least one element selected from the group consisting of Sr, Ca, Ba, Mg and Zn, X is at least one element selected from the group consisting of F, Cl, Br and I, and R is at least one element selected from the group consisting of Eu, Mn and a combination of Eu and Mn).

The alkaline earth metal element boride halogen phosphors include $M_2B_5O_9X$:R (M is at least one element selected from the group consisting of Sr, Ca, Ba, Mg and Zn, X is at least one element selected from the group consisting of F, Cl, Br and I, and R is at least one element selected from the group consisting of Eu, Mn and a combination of Eu and Mn).

The alkaline earth metal element aluminate phosphors include $SrAl_2O_4$:R, $Sr_4Al_{14}O_{25}$:R, $CaAl_2O_4$:R, $BaMg_2Al_{16}O_{27}$:R and $BaMgAl_{10}O_{17}$:R (R is at least one element selected from the group consisting of Eu, Mn and a combination of Eu and Mn).

The alkaline earth sulfide-based phosphors include $La_2O_2S$:Eu, $Y_2O_2S$:Eu, $Gd_2O_2S$:Eu and the like.

The rare earth aluminate phosphors activated mainly with a lanthanoid element such as Ce include YAG phosphors having the compositions of $Y_3Al_5O_{12}$:Ce, $(Y_{0.8}Gd_{0.2})_3Al_5O_{12}$:Ce, $Y_3(Al_{0.8}Ga_{0.2})_5O_{12}$:Ce and $(Y, Gd)_3(Al, Ga)_5O_{12}$:Ce. There are also included $Tb_3Al_5O_{12}$:Ce and $Lu_3Al_5O_{12}$:Ce wherein a part or the whole of Y is substituted with Tb, Lu or the like.

Other phosphors include ZnS:Eu, $Zn_2GeO_4$:Mn and $MGa_2S_4$:Eu (M is at least one element selected from the group consisting of Sr, Ca, Ba, Mg and Zn, and X is at least one element selected from the group consisting of F, Cl, Br and I).

The phosphors described above may include at least one element selected from the group consisting of Tb, Cu, Ag, Au, Cr, Nd, Dy, Co, Ni and Ti instead of, or in addition to, Eu as required.

Other phosphors having compositions different from those described above may also be used as long as similar performances and effects can be achieved.

The second phosphor may be one which is excited by the excitation light of light emitting element and emits light of yellow, red, green or blue color. Phosphors emitting light of intermediate colors such as greenish yellow, blue-green and orange may also be used.

EXAMPLES

Figure 2:
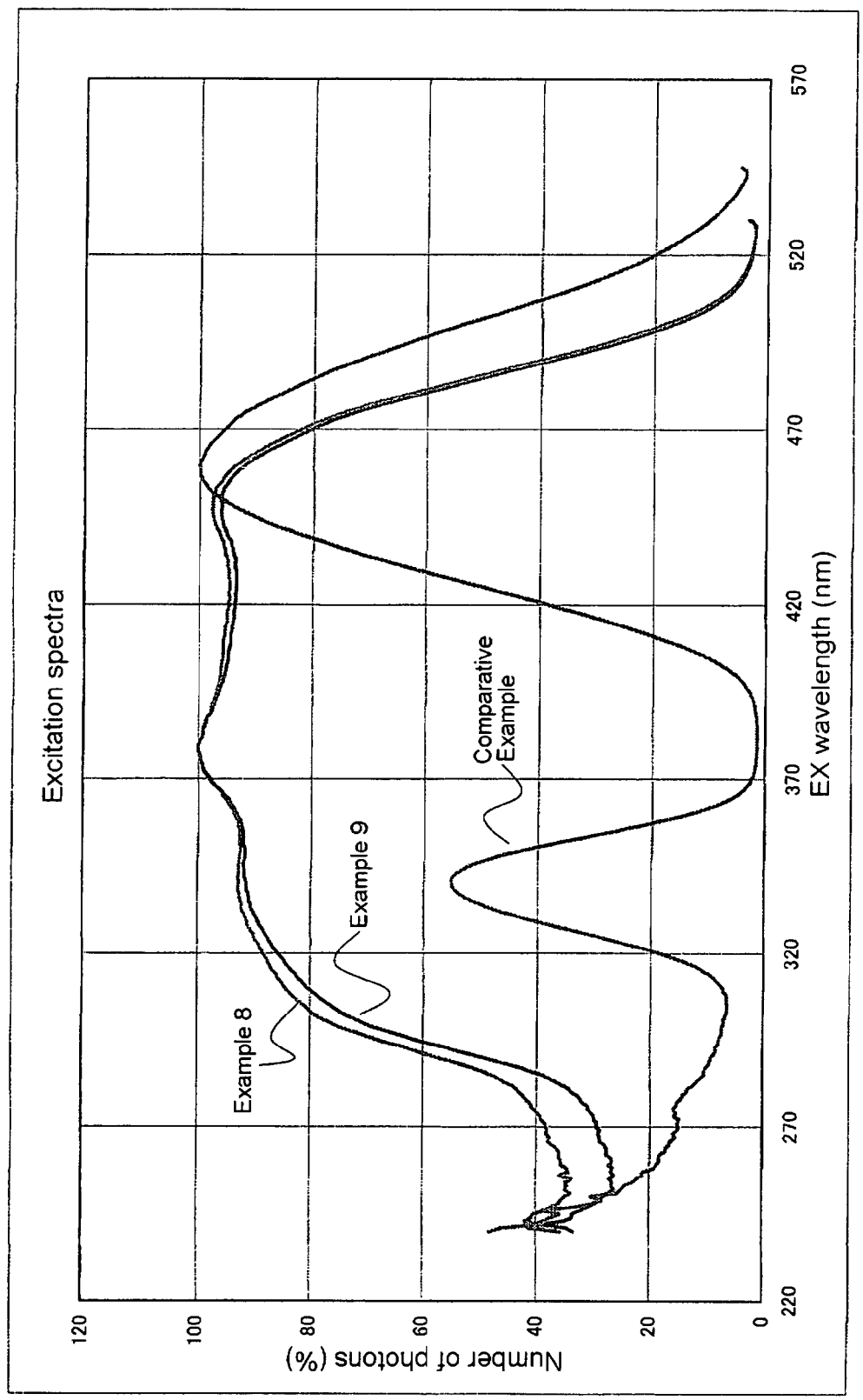
FIG. 2 shows excitation spectra of Examples 8 and 9.
Figure 3:
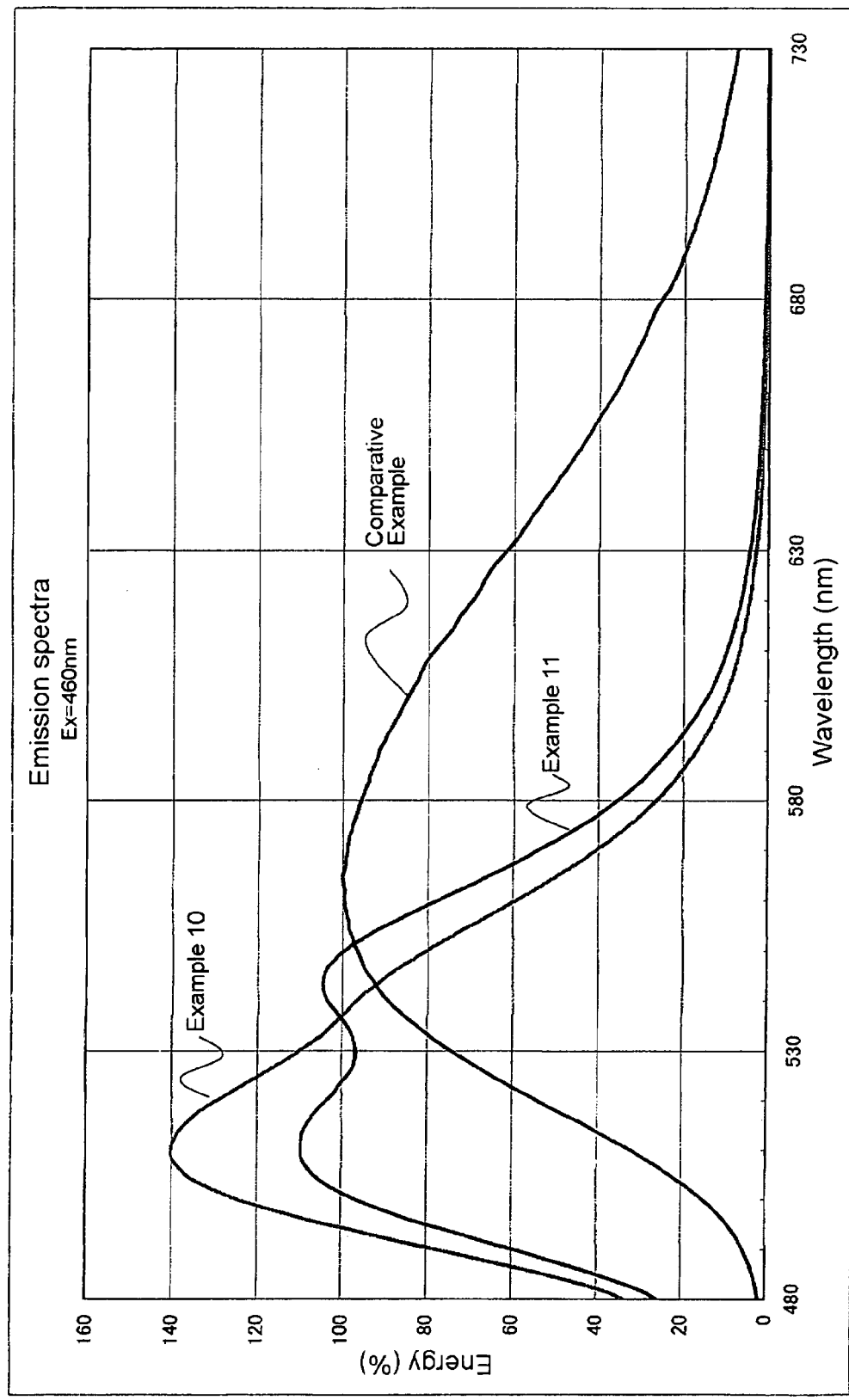
FIG. 3 shows emission spectra of Examples 10 and 11.
Figure 4:
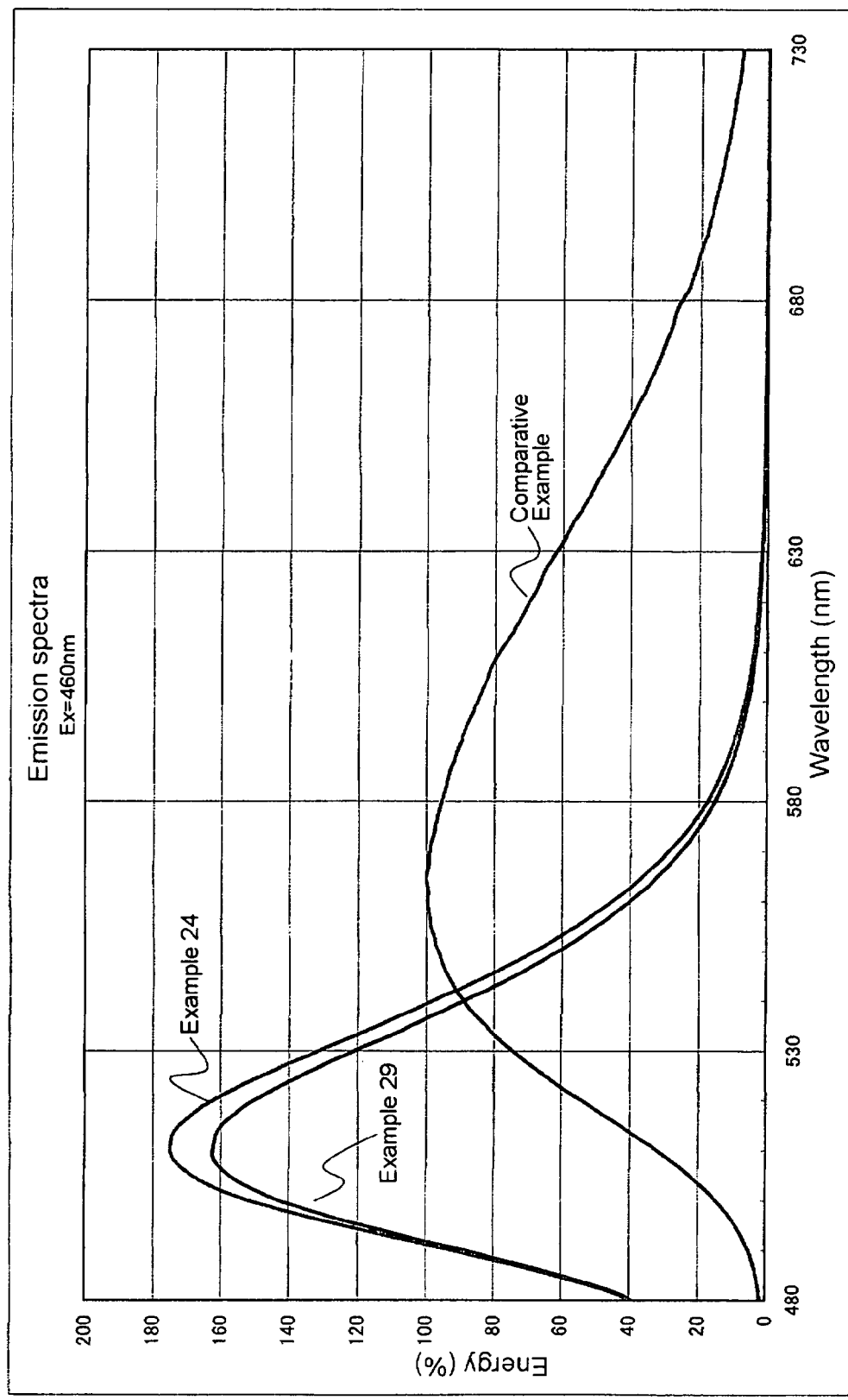
FIG. 4 shows emission spectra of Examples 24 and 29.

The present invention will now be described by way of Examples. FIG. 1 shows emission spectra of Examples 8 and 9. FIG. 2 shows excitation spectra of Examples 8 and 9. FIG. 3 shows emission spectra of Examples 10 and 11. FIG. 4 shows emission spectra of Examples 24 and 29. It is noted that considering evaporations of alkaline earth metal elements such as Ca and the like during the firing step in the manufacturing process, the amount(s) of the alkaline earth metal element(s) used to be mixed as raw material(s) are larger than those of such element(s) in final products having the intended compositions.

Examples 1 to 5

In example 1, the raw materials are mixed to finally produce a composition of $Ca_{8.475}Eu_{0.025}MgSi_4O_{16}Cl_2$ (i.e. intended composition). Examples 2 to 5 relate to compositions in which amounts of Ca and Eu are arranged so that the total amount of Ca and Eu is 8.500 mols. Specifically, Example 2 relates to a phosphor having the composition of $Ca_{8.450}Eu_{0.050}MgSi_4O_{16}Cl_2$. Example 3 relates to a phosphor having the composition of $Ca_{8.425}Eu_{0.075}MgSi_4O_{16}Cl_2$. Example 4 relates to a phosphor having the composition of $Ca_{8.350}Eu_{0.150}MgSi_4O_{16}Cl_2$. Example 5 relates to a phosphor having the composition of $Ca_{8.250}Eu_{0.250}MgSi_4O_{16}Cl_2$.

Examples 2 to 33 are manufactured by methods almost the same as the method in Example 1, and therefore description thereof may partly be omitted.

In Example 1, $CaCO_3$, $Eu_2O_3$, $MgCO_3$, $SiO_2$ and $CaCl_2$ are used as the raw materials. $CaCO_3$, $Eu_2O_3$, $MgCO_3$, $SiO_2$ and $CaCl_2$ are weighed out so that a molar ratio of the elements becomes Ca:Eu:Mg:Si:Cl=8.475:0.025:1:4:2. An amount of the component Cl, however, is increased to 1.5 times. Examples 2 to 5 are the same as in Example 1 except that the intended compositions are different.

The weighed raw materials are subjected to sufficient dry mixing in a ball mill. The mixed materials are put into a crucible, and fired at 1100° C. in a reducing atmosphere for 3 hours.

The fired materials are grinded and classified to obtain the desired phosphor powder.

Measurement results as to the phosphors of Examples 1 to 5 are shown in Table 1. Color tone x, color tone y and efficiency of light emission (%) of the phosphors of Examples 1 to 5 when excited by irradiation with light having wavelength of about 460 nm are shown. YAG phosphor $(Y_{0.8}Gd_{0.2})_3Al_5O_{12}$:Ce which emits yellow light is used as Comparative Example. The same applies also to Examples 1 to 42.

TABLE 1

|  | Color tone x | Color tone y | Efficiency of light emission (%) |
|---|---|---|---|
| Example 1 | 0.159 | 0.643 | 57.1 |
| Example 2 | 0.162 | 0.649 | 74.7 |
| Example 3 | 0.166 | 0.652 | 80.4 |
| Example 4 | 0.174 | 0.660 | 96.4 |
| Example 5 | 0.196 | 0.664 | 97.1 |

The phosphor of Example 1, when excited by irradiation with light having wavelength of about 460 nm, emits green light (color tone x/y=0.159/0.643). Brightness of light emission is 57.1% of that of Comparative Example.

When the phosphors of Examples 2 to 5 are excited similarly, very high brightness is achieved with the brightness of light emission by the phosphors of Example 4 being 96.4% and the brightness of light emission by the phosphors of Example 5 being 97.1%.

Therefore, proportions of Ca:Eu=8.425:0.075 to 8.10:0.40 in molar ratio are preferably employed.

Examples 6 and 7

In example 6, the raw materials are mixed to finally produce a composition of $Ca_{7.7}Sr_{0.5}Eu_{0.3}MgSi_4O_{16}Cl_2$. In example 7, the raw materials are mixed to finally produce a composition of $Ca_{7.7}Ba_{0.5}Eu_{0.3}MgSi_4O_{16}Cl_2$. The compositions of examples 6 and 7 are such that portions of Ca are substituted with Sr and Ba, respectively. Amounts of Ca, Sr and Ba are changed so that the total amounts of Ca, Sr and Eu or the total amounts of Ca, Ba and Eu is 8.500 mols.

In Example 6, $CaCO_3$, $Eu_2O_3$, $MgCO_3$, $SiO_2$, $SrCl_2$ and $CaCl_2$ are used as the raw materials. $CaCO_3$, $SrCl_2$, $Eu_2O_3$, $MgCO_3$, $SiO_2$ and $CaCl_2$ are weighed out so that a molar ratio of the elements becomes Ca:Sr:Eu:Mg:Si:Cl=7.7:0.5:0.3:1:4:2. An amount of the component Cl, however, is increased to 1.5 times. Example 7 is the same as in Example 6 except that the raw materials are different.

Measurement results as to the phosphors of Examples 6 and 7 are shown in Table 2.

TABLE 2

|  | Color tone x | Color tone y | Efficiency of light emission (%) |
|---|---|---|---|
| Example 6 | 0.215 | 0.664 | 82.9 |
| Example 7 | 0.211 | 0.656 | 55.5 |

The phosphor of Example 6, when excited by irradiation with light having wavelength of about 460 nm, emits green light (color tone x/y=0.215/0.664). High brightness of light emission, 82.9% of that of Comparative Example, is achieved.

Examples 8 and 9

In example 8, the raw materials are mixed to finally produce a composition of $Ca_{8.1}Mn_{0.2}Eu_{0.2}MgSi_4O_{16}Cl_2$. In example 9, the raw materials are mixed to finally produce a composition of $Ca_{8.1}Mn_{0.4}Eu_{0.2}MgSi_4O_{16}Cl_2$. In Examples 8 and 9, Ca and Mn are included.

In Example 8, $CaCO_3$, $MnCO_3$, $Eu_2O_3$, $MgCO_3$, $SiO_2$ and $CaCl_2$ are used as the raw materials. $CaCO_3$, $MnCO_3$, $Eu_2O_3$, $MgCO_3$, $SiO_2$ and $CaCl_2$ are weighed out so that a molar ratio of the elements becomes Ca:Mn:Eu:Mg:Si:Cl=8.1:0.2:0.2:1:4:2. An amount of the component Cl, however, is increased to 1.5 times. Specifically, quantities of the materials are 66.1 g for $CaCO_3$, 8.43 g for $MnCO_3$, 3.52 g for $Eu_2O_3$, 2.30 g for $MnCO_3$, 24.0 g for $SiO_2$ and 16.7 g for $CaCl_2$. Example 9 is the same as in Example 8 except that the intended composition are different.

The raw materials are weighed and are subjected to sufficient dry mixing in a ball mill. The mixed materials are put into a crucible, and is heated at a rate of 300° C. per hour up to 1100° C. in a reducing atmosphere of $N_2$ and $H_2$, followed by firing at 1100° C. for 3 hours.

The fired materials are grinded and classified to obtain the desired phosphor powder.

Measurement results as to the phosphors of Examples 8 and 9 are shown in Table 3.

TABLE 3

|  | Color tone x | Color tone y | Efficiency of light emission (%) |
|---|---|---|---|
| Example 8 | 0.363 | 0.60 | 97.5 |
| Example 9 | 0.389 | 0.586 | 76.2 |

The phosphor of Example 8, when excited by irradiation with light having wavelength of about 460 nm, emits greenish yellow light (color tone x/y=0.363/0.602). Brightness of light emission is 97.5% of that of Comparative Example.

Examples 10 to 14

In example 10, the raw materials are mixed to finally produce a composition of $Ca_{8.275}Mn_{0.025}Eu_{0.2}MgSi_4O_{16}Cl_2$. Examples 11 to 14 have compositions in which amounts of Ca and Mn are arranged so that the total content of Ca, Mn and Eu is 8.500 mols. Specifically, the composition of Example 11 is $Ca_{8.25}Mn_{0.05}Eu_{0.2}MgSi_4O_{16}Cl_2$. The composition of Example 12 is $Ca_{8.20}Mn_{0.10}Eu_{0.2}MgSi_4O_{16}Cl_2$. The composition of Example 13 is $Ca_{8.00}Mn_{0.30}Eu_{0.2}MgSi_4O_{16}Cl_2$. The composition of Example 14 is $Ca_{7.80}Mn_{0.50}Eu_{0.2}MgSi_4O_{16}Cl_2$.

In Example 10, $CaCO_3$, $MnCO_3$, $Eu_2O_3$, $MgCO_3$, $SiO_2$ and $CaCl_2$ are used as the raw materials. $CaCO_3$, $MnCO_3$, $Eu_2O_3$, $MgCO_3$, $SiO_2$ and $CaCl_2$ are weighed out so that a molar ratio of the elements becomes Ca:Mn:Eu:Mg:Si:Cl=8.275:0.025:0.2:1:4:2. An amount of the component Cl, however, is increased to 1.5 times. Examples 11 to 14 are the same as in Example 10 except that intended compositions are different.

Measurement results as to the phosphors of Examples 10 to 14 are shown in Table 4.

TABLE 4

|  | Color tone x | Color tone y | Efficiency of light emission (%) |
| --- | --- | --- | --- |
| Example 10 | 0.227 | 0.644 | 81.8 |
| Example 11 | 0.267 | 0.635 | 83.9 |
| Example 12 | 0.306 | 0.619 | 83.1 |
| Example 13 | 0.377 | 0.583 | 72.1 |
| Example 14 | 0.395 | 0.575 | 65.3 |

The phosphor of Example 10, when excited by irradiation with light having wavelength of about 460 nm, emits green light (color tone x/y=0.227/0.644). High brightness of light emission is achieved, 81.8% in Example 10, 83.9% in Example 11 and 83.1% in Example 12, compared to that of Comparative Example.

Examples 15 to 17

In Example 15, the raw materials are mixed to finally produce a composition of $Ca_{8.00}Mn_{0.10}Eu_{0.4}MgSi_4O_{16}Cl_2$. Examples 16 and 17 have compositions in which amounts of Ca and Mn are arranged so that the total amount of Ca, Mn and Eu is 8.500 mols. Specifically, Example 16 has composition of $Ca_{7.80}Mn_{0.30}Eu_{0.4}MgSi_4O_{16}Cl_2$. Example 17 has composition of $Ca_{7.60}Mn_{0.50}Eu_{0.4}MgSi_4O_{16}Cl_2$.

In Example 15, $CaCO_3$, $MnCO_3$, $Eu_2O_3$, $MgCO_3$, $SiO_2$ and $CaCl_2$ are used as the raw materials. $CaCO_3$, $MnCO_3$, $Eu_2O_3$, $MgCO_3$, $SiO_2$ and $CaCl_2$ are weighed out so that a molar ratio of the elements becomes Ca:Mn:Eu:Mg:Si:Cl=8.00:0.10:0.4:1:4:2. An amount of the component Cl, however, is increased to 1.5 times. Examples 16 and 17 are the same as in Example 15 except that intended compositions are different.

Measurement results as to the phosphors of Examples 15 to 17 are shown in Table 5.

TABLE 5

|  | Color tone x | Color tone y | Efficiency of light emission (%) |
| --- | --- | --- | --- |
| Example 15 | 0.332 | 0.624 | 86.3 |
| Example 16 | 0.383 | 0.589 | 58.8 |
| Example 17 | 0.400 | 0.577 | 47.3 |

The phosphor of Example 15, when excited by irradiation with light having wavelength of about 460 nm, emits greenish yellow light (color tone x/y=0.332/0.624). High brightness of light emission, 86.3% of that of Comparative Example, is achieved.

Examples 18 to 21

In Example 18, the raw materials are mixed to finally produce a composition of $Ca_{8.1}Eu_{0.4}MgSi_4O_{16}Cl_2$. Examples 18 to 21 have compositions in which amounts of Cl are arranged.

In Example 18, $CaCO_3$, $Eu_2O_3$, $MgCO_3$, $SiO_2$ and $CaCl_2$ are used as the raw materials. $CaCO_3$, $Eu_2O_3$, $MgCO_3$, $SiO_2$ and $CaCl_2$ are weighed out so that a molar ratio of the elements becomes Ca:Eu:Mg:Si:Cl=8.1:0.4:1:4:2. In Example 18, the amount of the component Cl is increased to 1.5 times. In Example 19, the amount of the component Cl is increased to 2.0 times. In Example 20, the amount of the component Cl is increased to 3.0 times. In Example 21, the amount of the component Cl is increased to 4.0 times. Examples 19 to 21 are the same as in Example 18 except that the intended compositions are different.

Measurement results as to the phosphors of Example 18 are shown in Table 6.

TABLE 6

|  | Color tone x | Color tone y | Efficiency of light emission (%) |
| --- | --- | --- | --- |
| Example 18 | 0.216 | 0.665 | 90.6 |

The phosphor of Example 18, when excited by irradiation with light having wavelength of about 460 nm, emits green light (color tone x/y=0.216/0.665). High brightness of light emission, 90.6% of that of Comparative Example is achieved. No measurements are carried out for Examples 19 to 23.

Examples 22 and 23

In Examples 22 and 23, the raw materials are mixed to finally produce a composition of $Ca_{8.2}Eu_{0.3}MgSi_4O_{16}(Cl, Br)_2$. Examples 22 and 23 have compositions in which amounts of Cl and Br are arranged.

In Example 22, $CaCO_3$, $Eu_2O_3$, $MgCO_3$, $SiO_2$, $CaCl_2$ and $CaBr_2$ are used as the raw materials. $CaCO_3$, $Eu_2O_3$, $MgCO_3$, $SiO_2$, $CaCl_2$ and $CaBr_2$ are weighed out so that a molar ratio of the elements becomes Ca:Eu:Mg:Si:(Cl, Br)=8.2:0.3:1:4:2. In Example 22, 1.125 mols of $CaCl_2$ and 0.375 mols of $CaBr_2$ are used and a total amount of Cl and Br is increased to 1.5 times. In Example 23, 0.75 mols of $CaCl_2$ and 0.75 mols of $CaBr_2$ are used, and a total amount of Cl and Br is increased to 1.5 times.

Examples 22 and 23 provide phosphors which emit greenish yellow light.

Examples 24 and 33

In Example 24, the raw materials are mixed to finally produce a composition of $Ca_{8.1}Eu_{0.2}Ce_{0.2}MgSi_4O_{16}Cl_2$. Element Ce is substituted with Pr in Example 25, with Nd in Example 26, with Sm in Example 27, with Tb in Example 28, with Dy in Example 29, with Ho in Example 30, with Er in Example 31, with Tm in Example 32, and with Yb in Example 33. In Examples 24 to 33, a portion of Eu in each example is substituted with another rare earth element. In Examples 24 to 33, total amounts of Ca, Eu and rare earth elements are arranged to 8.5 mols.

Measurement results as to the phosphors of Examples 24 to 33 are shown in Table 7.

TABLE 7

|  | Color tone x | Color tone y | Efficiency of light emission (%) |
| --- | --- | --- | --- |
| Example 24 | 0.187 | 0.659 | 83.7 |
| Example 25 | 0.182 | 0.660 | 74.4 |
| Example 26 | 0.174 | 0.651 | 62.3 |
| Example 27 | 0.177 | 0.654 | 60.8 |
| Example 28 | 0.179 | 0.656 | 70.5 |
| Example 29 | 0.182 | 0.658 | 76.9 |
| Example 30 | 0.182 | 0.659 | 63.3 |
| Example 31 | 0.182 | 0.650 | 45.6 |
| Example 32 | 0.181 | 0.660 | 69.3 |
| Example 33 | 0.179 | 0.659 | 39.1 |

The phosphor of Example 24, when excited by irradiation with light having wavelength of about 460 nm, emits green light (color tone x/y=0.187/0.659). High brightness of light emission, 83.7% of that of Comparative Example is achieved.

Examples 34 to 38

In Example 34, the raw materials are mixed to finally produce a composition of $Ca_{7.3}Eu_{0.2}MgSi_4O_{15}Cl_2$. Examples 35 to 38 have compositions in which molar ratios of Ca and Si are arranged. Specifically, Example 35 relates to phosphor having the composition of $Ca_{7.8}Eu_{0.2}MgSi_4O_{15.5}Cl_2$. Example 36 relates to phosphor having the composition of $Ca_{8.3}Eu_{0.2}MgSi_4O_{16}Cl_2$. Example 37 relates to phosphors having the composition of $Ca_{8.8}Eu_{0.2}MgSi_4O_{16.5}Cl_2$. Example 38 relates to phosphors having the composition of $Ca_{9.3}Eu_{0.2}MgSi_4O_{17}Cl_2$.

Measurement results as to the phosphors of Examples 34 to 38 are shown in Table 8.

TABLE 8

|  | Color tone x | Color tone y | Efficiency of light emission (%) |
| --- | --- | --- | --- |
| Example 34 | 0.178 | 0.648 | 58.5 |
| Example 35 | 0.176 | 0.649 | 60.2 |
| Example 36 | 0.187 | 0.655 | 76.9 |
| Example 37 | 0.174 | 0.650 | 60 |
| Example 38 | 0.174 | 0.650 | 58.5 |

The phosphor of Example 34, when excited by irradiation with light having wavelength of about 460 nm, emits green light (color tone x/y=0.178/0.648).

Examples 39 to 42

In Example 39, the raw materials are mixed to finally produce a composition of $Ca_{8.10}Eu_{0.40}MgSi_4O_{16}Cl_2$. Examples 40 to 46 have compositions in which amounts of Ca and Eu are arranged so that total amounts of Ca, Eu are controlled to 8.50 mols. Specifically, Example 40 relates to phosphor having the composition of $Ca_{8.15}Eu_{0.35}MgSi_4O_{16}Cl_2$. Example 41 relates to phosphor having the composition of $Ca_{8.20}Eu_{0.30}MgSi_4O_{16}Cl_2$. Example 42 relates to phosphors having the composition of $Ca_{8.25}Eu_{0.25}MgSi_4O_{16}Cl_2$.

In Example 39, $CaCO_3$, $Eu_2O_3$, $MgCO_3$, $SiO_2$ and $CaCl_2$ are used as the raw materials. $CaCO_3$, $Eu_2O_3$, $MgCO_3$, $SiO_2$ and $CaCl_2$ are weighed out so that a molar ratio of the elements becomes Ca:Eu:Mg:Si:Cl=8.10:0.40:1:4:2. An amount of Cl is increased to 1.5 times. The same applies also to Examples 40 to 42, except that compositions are different from that of Example 39.

Measurement results as to the phosphors of Examples 39 to 42 are shown in Table 9.

TABLE 9

|  | Color tone x | Color tone y | Efficiency of light emission (%) |
| --- | --- | --- | --- |
| Example 39 | 0.208 | 0.657 | 71.3 |
| Example 40 | 0.200 | 0.657 | 70 |
| Example 41 | 0.194 | 0.656 | 70.2 |
| Example 42 | 0.186 | 0.654 | 70.5 |

The phosphor of Example 39, when excited by irradiation with light having wavelength of about 460 nm, emits green light (color tone x/y=0.208/0.657). Brightness of light emission is 71.3% of that of Comparative Example.

In Example 43, the raw materials are mixed to finally produce a composition of $Ca_{8.20}Eu_{0.30}MgSi_4O_{16}Cl_2$. In Example 44, the raw materials are mixed to finally produce a composition of $Ca_{9.20}Eu_{0.30}MgSi_4O_{17}Cl_2$.

In Examples 43 and 44, the mixed materials which are similar to those of Example 1 are fired at 1100° C. for 5 hours.

The phosphor of Example 43, when excited by irradiation with light having wavelength of about 460 nm, emits green light (color tone x/y=0.227/0.661) with peak emission wavelength of 517 nm. The phosphor of Example 44, when excited by irradiation with light having wavelength of about 460 nm in a same way as to the phosphor of Example 44, emits green light (color tone x/y=0.218/0.658) with peak emission wavelength of 513 nm.

The phosphor of the present invention can be used in a light emitting device in combination with a light emitting element. The light emitting device which contains the phosphor can be used in signal lights, illumination apparatuses, displays, indicators and the like.

What is claimed is:

1. A phosphor having a composition represented by the following general formula:

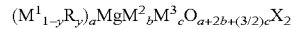

$(M^1_{1-y}R_y)_a MgM^2{}_b M^3{}_c O_{a+2b+(3/2)c} X_2$ wherein $M^1$ is at least one element selected from the group consisting of Ca, Sr, Ba, Zn and Mn, $M^2$ is at least one element selected from the group consisting of Si, Ge and Sn, $M^3$ is at least one element selected from the group consisting of B, Al, Ga and In, X is at least one element selected from the group consisting of F, Cl, Br and I, R is at least one element selected from the group consisting of rare earth elements with Eu being inevitable element, and y, a, b and c satisfy the following relationships of $0.0001 \leq y \leq 0.3$, $8.5 \leq a < 9.5$, $3.0 \leq b < 5.0$ and $0 \leq c < 1.0$.

2. A light emitting device comprising a light source and a phosphor which is excited by light emitted from the light source and has a composition represented by the following general formula:

$$(M^1{}_{1-y}R_y)_a MgM^2{}_b M^3{}_c O_{a+2b+(3/2)c} X_2$$

wherein $M^1$ is at least one element selected from the group consisting of Ca, Sr, Ba, Zn and Mn, $M^2$ is at least one element selected from the group consisting of Si, Ge and Sn, $M^3$ is at least one element selected from the group consisting of B, Al, Ga and In, X is at least one element selected from the group consisting of F, Cl, Br and I, R is at least one element selected from the group consisting of rare earth elements with Eu being inevitable element, and y, a, b and c satisfy the following relationships of $0.0001 \leq y \leq 0.3$, $8.5 \leq a < 9.5$, $3.0 \leq b < 5.0$ and $0 \leq c < 1.0$.

3. The phosphor as recited in claim 1, wherein the phosphor includes Si and a portion of Si is substituted with Ge and/or Sn.

4. The phosphor as recited in claim 1, wherein the phosphor includes Cl and a portion of Cl is substituted with at least one of F, Br and I.

5. The phosphor as recited in claim 1, wherein the phosphor includes Eu and a portion of Eu is substituted with at least one element selected from the group consisting of Pr, Nd, Sm, Tb, Dy, Ho, Er, Tm and/or Yb.

6. The phosphor as recited in claim 1, wherein the phosphor includes Ca and proportions of Ca:Eu of 8.425:0.075 to 8.10:0.40 in molar ratio are employed.

7. The phosphor as recited in claim 1, wherein the phosphor includes Ca and Mn as essential elements.

8. The phosphor as recited in claim 7, wherein the amount of Mn is in a range of 0.30 to 0.50 in molar ratio.

9. The phosphor as recited in claim 7, wherein emission of the phosphor has a chromaticity coordinate in a pentagonal area defined by following five chromaticity coordinates x/y=0.377/0.583, x/y=0.383/0.589, x/y=0.389/0.586, x/y=0.400/0.577 and x/y=0.395/0.575.

10. The light emitting device as recited in claim 2, wherein the light emitting device has a peak of emission at a wavelength in a range from 240 nm to 520 nm.

11. The light emitting device as recited in claim 2, wherein the light emitting device has a peak of emission at a wavelength in a range from 320 nm to 480 nm.

12. The light emitting device as recited in claim 2, wherein the phosphor includes Si and a portion of Si is substituted with Ge and/or Sn.

13. The light emitting device as recited in claim 2, wherein the phosphor includes Cl and a portion of Cl is substituted with at least one of F, Br and I.

14. The light emitting device as recited in claim 2, wherein the phosphor includes Eu and a portion of Eu is substituted with at least one element selected from the group consisting of Pr, Nd, Sm, Tb, Dy, Ho, Er, Tm and/or Yb.

15. The light emitting device as recited in claim 2, wherein the phosphor includes Ca and proportions of Ca:Eu of 8.425:0.075 to 8.10:0.40 in molar ratio are employed.

16. The light emitting device as recited in claim 2, wherein the phosphor includes Ca and Mn as essential elements.

17. The light emitting device as recited in claim 16, wherein the amount of Mn is in a range of 0.30 to 0.50 in molar ratio.

18. The light emitting device as recited in claim 17, wherein emission of the phosphor has a chromaticity coordinate in a pentagonal area defined by following five chromaticity coordinates x/y=0.377/0.583, x/y=0.383/0.589, x/y=0.389/0.586, x/y=0.400/0.577 and x/y=0.395/0.575.

19. A phosphor having a composition represented by the following general formula:

$$(M^1{}_{1-y}R_y)_a MgM^2{}_b M^3{}_c O_{a+2b+(3/2)c} X_2$$

wherein $M^1$ is at least one element selected from the group consisting of Ca, Sr, Ba, Zn and Mn, $M^2$ is at least one element selected from the group consisting of Si, Ge and Sn, $M^3$ is at least one element selected from the group consisting of B, Al, Ga and In, X is at least one element selected from the group consisting of rare earth elements with Eu being inevitable element, and y, a, b and c satisfy the following relationships of $0.0001 \leq y \leq 0.3$, a=7.5, $3.0 < b < 5.0$ and $0 \leq c < 1.0$.

20. A light emitting device comprising a light source and the phosphor as recited in claim 19.

* * * * *